(12) United States Patent
Feller

(10) Patent No.: US 6,681,645 B1
(45) Date of Patent: Jan. 27, 2004

(54) MOVING TARGET FLOW METER

(76) Inventor: Murray F. Feller, 21577 NW. 75th Avenue Rd., Micanopy, FL (US) 32667

(*) Notice: Subject to any disclaimer, the term of this patent is extended or adjusted under 35 U.S.C. 154(b) by 3 days.

(21) Appl. No.: 10/113,411

(22) Filed: Apr. 1, 2002

(51) Int. Cl.[7] .................................................. G01F 1/28
(52) U.S. Cl. ................................................... 73/861.71
(58) Field of Search ....................... 73/861.74, 861.08, 73/861.71, 861.75

(56) References Cited

U.S. PATENT DOCUMENTS

| | | | | |
|---|---|---|---|---|
| 4,174,065 A | * | 11/1979 | Knauth | 236/49.1 |
| 4,184,466 A | * | 1/1980 | Nagele | 123/455 |
| 4,250,745 A | * | 2/1981 | Blatter et al. | 73/118.2 |
| 4,938,076 A | * | 7/1990 | Buchanan | 73/861.53 |
| 5,021,619 A | * | 6/1991 | Hutchinson | 200/81.9 M |
| 6,212,959 B1 | * | 4/2001 | Perkins | 73/861.77 |
| 6,253,625 B1 | * | 7/2001 | Samuelson et al. | 73/861.71 |

* cited by examiner

Primary Examiner—Edward Lefkowitz
Assistant Examiner—Corey D. Mack
(74) Attorney, Agent, or Firm—David Kiewit

(57) ABSTRACT

A target-type flow meter uses a target in a flowing fluid and selectively changes the orientation of the target with respect to the direction of flow of the fluid between two or mote orientations, where the target provides a different flow impedance in each of the orientations. This change in flow impedance gives rise to a corresponding difference in drag forces exerted on the target by the flowing fluid. Those forces, or displacements associated with them, are measured to determine the rate of fluid flow. In some cases the target may be a vane attached to a shaft rotated by a motor. In others, the target may be a vane structure attached to a post in a flexible fashion so that it can be oscillated transverse to the flow direction by fixed electromagnets acting on a permanent magnet portion of the vane structure.

15 Claims, 2 Drawing Sheets

MOVING TARGET FLOW METER

FIELD OF THE INVENTION

This invention relates to apparatus for determining the rate of flow of a fluid by sensing the force exerted by the fluid on a moveable element in the flow stream.

BACKGROUND INFORMATION

Target meters are commercially available to measure the flow rates of fluids. They are generally relatively simple, low cost devices consisting basically of a target, such as a disc, suspended in the flow stream by a rod that is attached to a force transducer. The force or torque arising from flowing fluid impacting the disc is sensed by the transducer, which provides an electrical output signal responsive to the flow rate of the fluid. These meters provide typical accuracies specified as several percent of span over a 10 to 1 flow range. The relatively poor accuracy of these meters at the lower flow rates limits their applications, and it is an object of this invention to improve their accuracy.

BRIEF SUMMARY OF THE INVENTION

The above and other objects are attained by target meters in accordance with various preferred embodiments of the present invention. Preferred embodiments of the present invention use a target in a flowing fluid where the orientation of the target to the direction of flow of the fluid can be selectively changed between two or more orientations, and where the target provides a different flow impedance in each of the orientations. This change in flow impedance gives rise to a corresponding difference in drag forces exerted on the target by the flowing fluid. Those forces, or the displacement associated with them are measured to determine the rate of fluid flow.

In some embodiments, the target orientation is changed by continuous rotation and electrical signals responsive to the variable drag on that target are processed to provide a measurement of fluid flow rate. In one preferred embodiment, the target is in the form of a rigid vane, extending radially outwards from a shaft which is attached to a transducer and rotated in the fluid flow stream. The drag forces imposed on the vane by the stream cyclically vary from a maximum to a minimum and are converted by the transducer into corresponding electrical signals. The magnitude of only the variational component of the electrical signal is used to determine flow rate. The transducer signals, which may form part of its output signal as may be necessitated by its power requirements, either AC or DC, or friction related loads, for example, are not used. By this means, the flow sensing error and in particular transducer zero drift relating to the conversion of target drag to a flow rate signal at low flow rates, is reduced thereby enabling the meter to be effectively used at lower flow rates.

In another preferred embodiment the angular orientation of a vane in the fluid flow stream is cyclically oscillated in alternate directions whereby the corresponding variation in drag forces are used by the transducer to provide flow rate responsive signals as in the first embodiment.

Although it is believed that the foregoing recital of features and advantages may be of use to one who is skilled in the art and wishes to learn how to practice the invention, it will be recognized that the foregoing is not intended to list all of the features and advantages. Moreover, it may be noted that various embodiments of the invention may provide various combinations of the hereinbefore recited features and advantages of the invention, and that less than all of the recited features and advantages or the invention, my be provided by some embodiments.

DETAILED DESCRIPTION OF THE INVENTION

Figure 1:
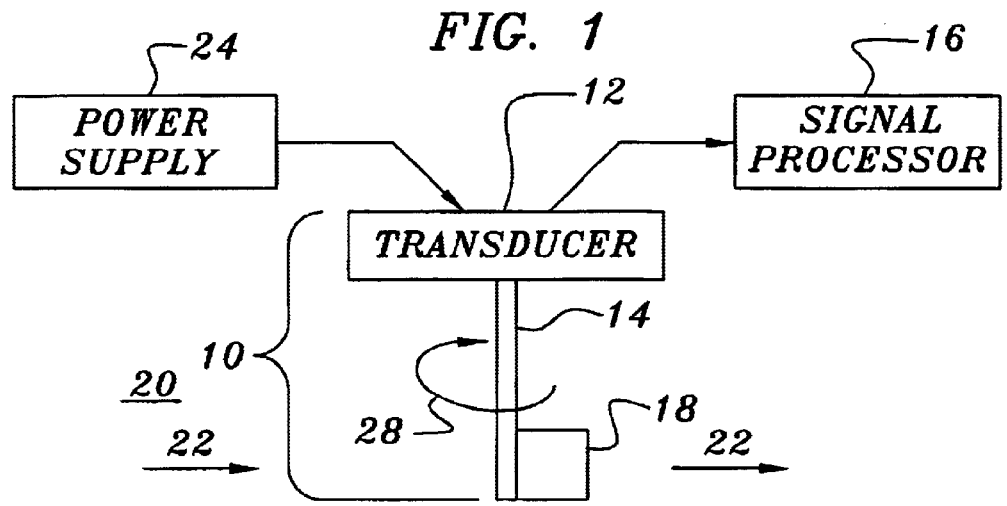
FIG. 1 is a schematic presentation of the principle components of a flow meter in accordance the present invention.

FIG. 1 schematically depicts some the components of a flow meter 10, comprising a transducer 12, a shaft 14, and a target or vane 18 that the transducer can move angularly as indicated by the arrow 28. A fluid 20 is in contact with and flows past the target 18 in a flow direction indicated by arrows 22. The transducer 12 is powered by an appropriate power supply 24 and provides a signal representative of its mechanical loading to a signal processor 16. The power supply 24 and the signal processor 16 may be integral to or remotely located from meter 10 and incorporate functions and techniques well established in the flow measurement art.

During operation of some embodiments of the invention, the transducer 12 provides a rotary motion through the shaft 14 to the vane 18. As the vane 18 rotates, its angular orientation with respect to the direction of fluid flow 22 changes. For half of a complete rotation a fluid flow acts to aid the rotation of the vane 18. For the other half of the rotation the fluid flow acts to impede the vane's motion. In this embodiment the transducer 12 provides both the rotary motion to the vane 18, and an electrical signal representing the torque load it is accommodating. When the fluid 20 flows, the transducer 12 supplies an electrical signal varying in magnitude according to the variable loading experienced by vane 18 to the signal processor 16. In the signal processor 16, this varying component of the signal, being an AC signal, is extracted from any non-varying portion of the transducer signal with a high pass filter (not shown) and is then magnitude detected to provide a signal responsive to the fluid flow rate. This signal is then further processed for linearization, temperature and other factors as required for the application.

On the other hand, when the fluid 20 is stationary its loading on the vane 18 is constant and therefore the transducer 12 output signal will not vary with angle during the course of a complete rotation. Transducer-related signal drifts affected by factors such as friction, temperature and time tend to change relatively slowly with respect to the rotational rate of a vane 18 and will be eliminated by the high pass filter in the signal processor 16. As a result, the output signal from the signal processor 16 at zero flow rate is more stable than that of prior art target meters which utilize transducer signals from an essentially fixed target. With well defined and stable zero and span calibration points, the meter 10 is therefore useful over a broader operating range of flow rates and may be specified for providing flow measurement accuracies as a percentage of flow rate rather than of span, as is typical of the prior art meters.

The transducer 12 is conveniently configured as a single device providing both the rotary motion and sensing the drag effects of the fluid load on the vane 18. Alternately, the transducer 12 may have separate components for each function. Furthermore, a complete three hundred sixty degree rotation of the vane 18 is not necessary for it to experience a variable loading responsive to fluid flow. For example, the vane 18 could be oscillated by some acute angle—e.g., thirty degrees—about a central position in which it was in alignment with the flow direction 22 in order to sense fluid loading effects. A relatively large vane could also be used in an arrangement in which its rotational angle with respect to the fluid flow direction 22 is controlled to provide a relatively constant flow induced drag. For example, a vane 18 could be angled at thirty degrees with respect to the flow direction 22 at low fluid flow rates and at a lesser angle of, say, five degrees at a high fluid flow rate in order to produce the same drag as was experienced at the low flow rate. This has the effect of increasing the measurement range of the meter and improving its linearity. The oscillating vane 18 may, in any case, be driven in both directions from the central position.

Figure 2:
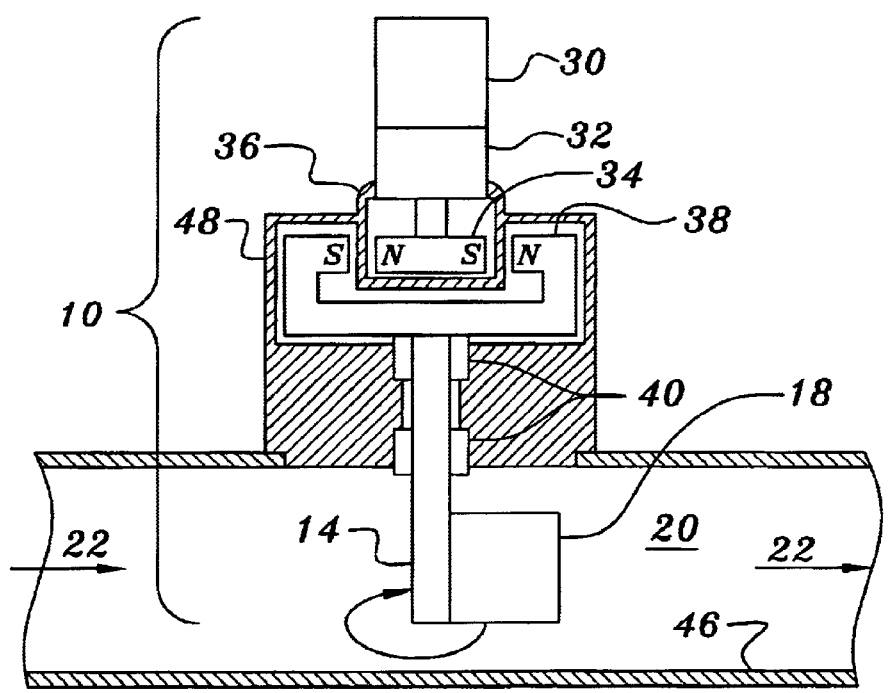
FIG. 2 is a side cross sectional view of meter of FIG. 1 showing greater component detail pertaining to a preferred embodiment of the present invention.

FIG. 2 depicts one embodiment of the flow meter 10. In this case the output from a motor 30 drives a gearbox 32 to rotate a drive magnet 34 housed within a protective barrier 36 used to seal the drive components off from wetted portions of the apparatus. On the other side of barrier 36, a slave magnet 38 is attached by means of a shaft 14 supported by bearings 40, to a vane 18. A suitable housing 48 encloses the meter components and mechanically couples the apparatus to a pipe or other flow passage 46 in which fluid 20 flows. Although the examples described herein are conveniently arranged to address the flow of fluid in a stationary pipe to which a sensing apparatus is fixedly attached, those skilled in the art will recognize that the same discussion applies to a variety of measurements of flow relative to a measurement location at which a flow target support is disposed. Such measurements embrace, but are not limited to, measurement of flow in open channels; measurement of water currents flowing past an inertially fixed structure, such as a dock; and flow of water past the hull of moving ship, in which case the flow measured is that of the ship relative to the water.

In the embodiment depicted in FIG. 2, a preferred motor 30 has operating power requirements that vary over a wide range in response to load changes. An example of such a motor is the type 1616E018ST manufactured by MicroMo Electronics, Inc. When used with a 10 volt power supply this motor requires only 4 milliamperes when unloaded but over 40 milliamperes fully loaded. The motor 30 drives a gear train 32 which increases its output torque and reduces its rotational speed. This causes parasitic motor generated signals, such as commutation ripple, to be much higher in frequency than the rotational speed of the vane 18 and thus allows them to be easily filtered out. A MicroMo gear train type 16AK with an 11.8:1 ratio is for example, attached to the above motor rotates the drive magnet 34 which is magnetically coupled through protective barrier 36 to the slave magnet 38. The slave magnet 38 is coupled by the shaft 14 to rotate the vane 18. In this embodiment the current supplied to the motor is representative of the shaft load and therefore of the flow-induced drag. Those skilled in the arts will recognized that one could alternately select a motor operated from a constant current source that produced a voltage variation responsive to load changes. Constant current operation is also advantageously used if the vane 18 is made to oscillate so that the magnitude of its deflection is responsive to loading effect of the fluid flow.

The rotational rate of vane 18 is typically slow and may range from a fraction of a turn per second to several turns per second. The off-center-of-gravity load represented by the vane 18 may be balanced by a compensating weight either on the shaft 14 or on the slave magnet 38. A small amount of mechanical vibration is normally present in any flow meter application so that the slave magnet 38 will tend to, on the average, be only slightly affected by mechanical friction and will smoothly follow the movement of the drive magnet 34, thus resulting in a precise transfer of torque between the gear train 32 and vane 18 at both high and low fluid flow rates. Because the variable torque loading on the motor 30 is transformed by the motor into a flow rate responsive signal, the variation in angular displacement between the drive and slave magnets 34 and 38, which occurs at different angular locations of the vane 18 does not seriously affect the precision of the flow rate measurement. As a result of the above, the meter 10 may be rugged and incorporate relatively large bearings 40 for long life and the ability to withstand the impacts which may be present, for example, during startup conditions when a liquid line is not full, or a steam line when solids or slugs of condensate are circulated.

The motor 30 will tend to have a higher shaft rotational rate when torque due to the flowing fluid is aiding the rotation and a lower shaft rotational rate when the flow is opposing the rotation. The resulting speed change, which reduces the dynamic range of the motor and may add further nonlinearities to the meter response, may be minimized by operating the motor 30 at a regulated constant speed. However, if the motor 30 speed is allowed to vary with vane loading the time differential between the rotational half cycle in which the vane torque aids the rotation and the rotational half cycle when that torque is in opposition can also be used to produce a signal responsive to flow rate.

Figure 3:
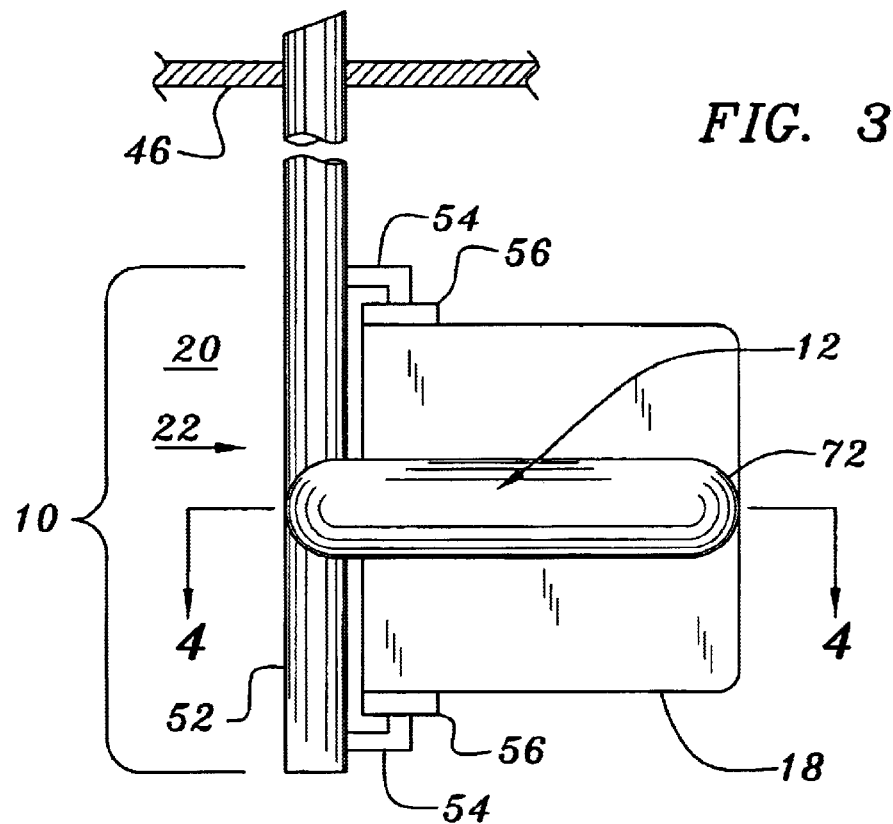
FIG. 3 is a side view of the vane and transducer assembly of a preferred embodiment of the present invention.
Figure 4:
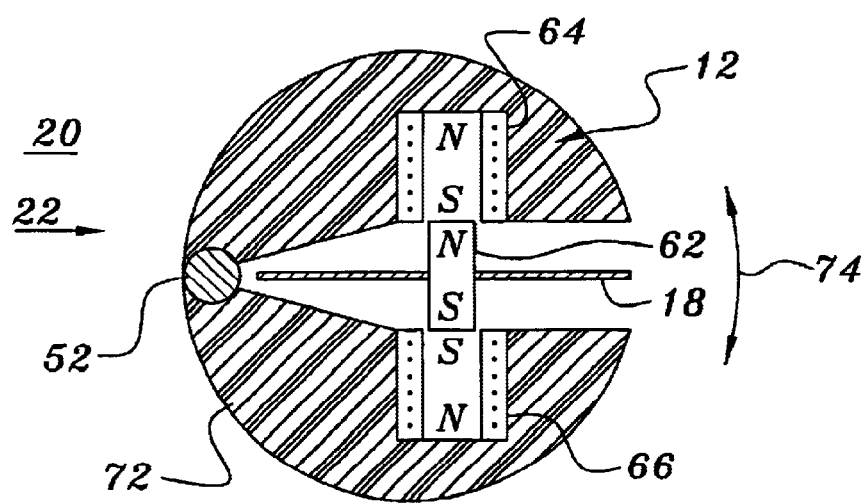
FIG. 4 is a bottom view section of the configuration of FIG. 3 along lines 4—4.

Although the transducer 12 is depicted in FIGS. 1 and 2 as being connected to the vane 18 by means of a shaft 14, the transducer may also be located close to the vane 18 and may even directly engage it in some embodiments of the invention. An example of such an arrangement is illustrated in the vane and transducer assembly of FIGS. 3 and 4, which comprise a preferred embodiment of the present invention. FIG. 3 is a side view of such an assembly while FIG. 4 shows a central cross section taken as shown by the double-headed arrow 4—4. In this embodiment both a streamlined wetted transducer enclosure 72 and a vane 18 are extend radially outward from a non-rotating post 52. The vane 18, in this embodiment, is attached to the post 52 in a compliant fashion in order to permit angular oscillations of the vane as indicated by the double headed arrow 74 in FIG. 4. The compliant attachment can take many forms, including the depicted combination of ell-shaped axle members 54 and bearings 56, by springs, or by directly attaching a vane made of a flexible sheet of material to the shaft 52. Moreover, the post 52 may readily be configured as a bluff body so as to efficiently produce a street of Karman vortices that would affect the vane 18.

In the preferred embodiment depicted in FIGS. 3 and 4 the transducer 12 comprises a magnet 62 attached to the vane 18 that cooperates with two electromagnets 64, 66 supported by the wetted enclosure 72 and energized to produce magnetic flux of opposing polarities in the space between them. These electromagnets may lie on the same axis, as depicted, or may be tilted away from that axis so as to be approximately tangent to the arc along which the permanent magnet 62 moves when the vane oscillates.

When the electromagnets 64 and 66 are energized to provide magnetic fields with the polarities indicated in FIG.

4, the permanent magnet 62 is attracted to move up further into the magnet 64 at the same time it is being pushed out from magnet 66 below. When the electrical current through electromagnets 64 and 66 is reversed, the polarities of their magnetic fields also reverse and the magnetic forces act on the permanent magnet 62 to move it in the opposite direction. The vane 18, being fixedly attached to the permanent magnet 62, will oscillate as indicated by the double headed arrow 74. These movements provide the angular displacement of vane 18 required for implementing the present invention. Those skilled in the art will recognize that other electromagnetic transducers could be used in place of the preferred embodiment depicted in the drawing. Alternate versions include, but are not limited to, one comprising a ferromagnetic portion of the vane, which may comprise a permanent magnet or other piece of metal attached thereto, arranged to cooperate with one or more windings fixedly attached to the enclosure in order to oscillate the vane.

If the permanent magnet 62 is of the alnico, samarium-cobalt or neodymium-iron-boron types, its presence within the magnetic fields of the electromagnets 64 and 66 substantially increases their electrical losses at high frequencies, for example several hundred kilohertz. Ferrite magnets, depending on their composition, may have a similar characteristic or may reduce the high frequency losses. The electrical signals used to produce the magnetic fields that operate to oscillate the vane are of much lower frequency, so that the magnetic generating and loss sensing signals can be easily separated by filtering. These losses are responsive to the penetration depth of the permanent magnet 62 into the electromagnets 64 and 66. By detecting these losses, a means is provided for determining the mechanical displacement of permanent magnet 62 and therefore the angular displacement of the vane 18. This is useful in a meter operational mode in which the forces producing the vane's angular deflection are constant, and the vane's deflection angle is responsive to the fluid induced drag forces used for determining fluid flow rate, or where a specific vane angular displacement is maintained and the forces required to provide that displacement are used to determine fluid flow rate. A regulated constant current through the electromagnets is a convenient way of providing precision control of the forces needed to produce the angular displacement and, just as in the case with the rotated vane, a transducer having a directly driven vane may be operated in several modes.

Alternately, the apparatus depicted in FIGS. 3 and 4 may be used in sensing arrangements in which fluid flow variations, rather than electromagnetic forces, drive the vane 18. These flow variations may be due, for example, to fluidic oscillators or vortex shedding, as may be the case if the post 52 is configured as a bluff body. Electrical signals responsive to angular movements of the vane 18 are then generated by motion of the permanent magnet 62 within the electromagnets 64 and 66 and can be to be electrically processed to become output signals representative of fluid flow rate. High frequency signal processing may also be used to determine the angular translation of the vane 18, if desired.

What is claimed is:

1. Apparatus for measuring a rate at which a fluid flows, the apparatus comprising:
    a target arranged so that the fluid impinges on the target when the fluid is flowing, the target having a flow impedance that varies with its angular orientation with respect to a direction of the flow; and
    an electromechanical transducer for both varying the orientation of the target and for supplying an output to a signal processor for sensing a variation in drag force associated with the corresponding variation of the flow impedance of the target.

2. The apparatus of claim 1 wherein the target comprises a rigid vane extending outwardly from a shaft and the transducer comprises an electric motor for rotating the shaft.

3. The apparatus of claim 1 wherein the target comprises a vane attached to a post and the transducer comprises at least one electric winding fixedly connected to the post and cooperating with a permanent magnet fixedly attached to the vane.

4. Apparatus for measuring a rate at which a fluid flows, the apparatus comprising:
    a target arranged so that the fluid impinges on the target when the fluid is flowing, the target moving by an amount that depends on the rate of fluid flow and on an external force applied to the target; and
    an electromechanical transducer for supplying the external force to the target and for supplying an output to a signal processor for sensing the amount that the target moves.

5. The apparatus of claim 4 wherein the target comprises a rigid vane extending outwardly from a shaft and the transducer comprises an electric motor for rotating the shaft.

6. The apparatus of claim 4 wherein the target comprises a vane attached to a post and the transducer comprises at least one electric winding fixedly connected to the post and cooperating with a permanent magnet fixedly attached to the vane.

7. A method of measuring a rate at which a fluid flows, the method comprising the steps of:
    disposing a vane extending radially outward from one of a shaft or a non-rotating post in the fluid;
    supplying, by means of an electromechanical transducer, an external force to change the orientation of the vane;
    providing, as a representation of the rate at which the fluid flows, an electrical signal responsive to a flow-induced drag force on the vane, the flow-induced drag force varying with the orientation.

8. The method of claim 7 wherein the vane is attached to a non-rotating post in a compliant fashion and in which the vane is oscillated by electromagnetic means comprising at least one winding fixedly connected to the post cooperating with a ferromagnetic portion of the vane.

9. The method of claim 7 wherein the vane is rigidly attached to a shaft rotated by an electric motor and wherein the electrical signal responsive to the flow-induced drag is representative of an electric current supplied to the motor.

10. The method of claim 7 wherein the vane is rigidly attached to a shaft rotated by an electric motor and wherein the electrical signal responsive to the flow-induced drag is representative of an electric voltage supplied to the motor.

11. The method of claim 7 wherein the step of providing the output representative of the rate at which the fluid flows comprises the substeps of acquiring an output signal from the electromechanical transducer; separating, by means of a signal processor, a time varying component from the output signal from the transducer; determining a magnitude of the time varying component; and supplying the magnitude as the electrical signal responsive to a flow-induced drag force on the vane.

12. Apparatus for measuring a rate at which fluid flows along a flow direction past a measurement location at which a support is disposed, the apparatus comprising:
    a vane extending from the support along the flow direction, the vane attached to the post in a compliant fashion to permit angular oscillation of the vane, the vane comprising a ferromagnetic portion;

at least one electric winding fixedly attached to the support adjacent the ferromagnetic portion of the vane, the winding having an axis transverse to the flow direction;

a power supply for supplying an electric current to the winding in order to move the vane along the axis of the winding and to thereby change an angle between the vane and the flow direction by an amount responsive to the flow rate of the fluid; and a signal processor for determining the flow rate of the fluid from a known functional relation between the magnitude of the change of the angle, the electric current and the fluid flow rate.

13. The apparatus of claim 12 wherein the ferromagnetic portion of the vane comprises a permanent magnet.

14. The apparatus of claim 12 wherein the vane comprises a flexible sheet of material directly attached to the post.

15. The apparatus of claim 12 wherein the vane is attached to the post by means comprising an axle and a bearing.

* * * * *